US011914511B2

(12) United States Patent
Spadini et al.

(10) Patent No.: US 11,914,511 B2
(45) Date of Patent: Feb. 27, 2024

(54) DECOUPLING ATOMICITY FROM OPERATION SIZE

(71) Applicant: Apple Inc., Cupertino, CA (US)

(72) Inventors: Francesco Spadini, Sunset Valley, TX (US); Gideon Levinsky, Cedar Park, TX (US); Mridul Agarwal, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 867 days.

(21) Appl. No.: 16/907,740

(22) Filed: Jun. 22, 2020

(65) Prior Publication Data

US 2021/0397555 A1 Dec. 23, 2021

(51) Int. Cl.
*G06F 12/0804* (2016.01)
*G06F 9/30* (2018.01)
*G06F 9/38* (2018.01)

(52) U.S. Cl.
CPC ...... *G06F 12/0804* (2013.01); *G06F 9/30043* (2013.01); *G06F 9/3826* (2013.01); *G06F 9/3834* (2013.01); *G06F 2212/601* (2013.01)

(58) Field of Classification Search
None
See application file for complete search history.

(56) References Cited

U.S. PATENT DOCUMENTS

| | | | | |
|---|---|---|---|---|
| 5,265,233 A * | 11/1993 | Frailong | .............. | G06F 12/0833 |
| | | | | 712/E9.032 |
| 6,170,001 B1 * | 1/2001 | Hinds | .................. | G06F 9/3877 |
| | | | | 712/E9.035 |
| 6,192,465 B1 * | 2/2001 | Roberts | ................... | G06F 9/382 |
| | | | | 712/216 |
| 6,304,963 B1 * | 10/2001 | Elwood | ................. | G06F 9/3865 |
| | | | | 712/E9.06 |
| 8,086,801 B2 * | 12/2011 | Hrusecky | .............. | G06F 9/3824 |
| | | | | 711/119 |
| 8,656,103 B2 * | 2/2014 | Yang | ..................... | G06F 9/3824 |
| | | | | 711/E12.017 |
| 9,052,889 B2 | 6/2015 | Jacobi et al. | | |
| 9,411,542 B2 | 8/2016 | Higham et al. | | |
| 9,424,034 B2 * | 8/2016 | Hinton | ................ | G06F 9/30163 |
| 9,786,338 B2 * | 10/2017 | Hinton | ................ | G06F 9/30043 |
| 9,971,626 B2 | 5/2018 | Busaba et al. | | |
| 10,102,888 B2 * | 10/2018 | Hinton | ................ | G06F 9/30109 |

(Continued)

FOREIGN PATENT DOCUMENTS

GB 2602814 A * 7/2022 ............... G06F 9/30

OTHER PUBLICATIONS

ISRWO, PCT/US2021/034512, dated Sep. 23, 2021, 15 pages.

*Primary Examiner* — Steven G Snyder
(74) *Attorney, Agent, or Firm* — Kowert, Hood, Munyon, Rankin & Goetzel, P.C.

(57) ABSTRACT

In an embodiment, a processor implements a different atomicity size (for memory consistency order) than the operation size. More particularly, the processor may implement a smaller atomicity size than the operation size. For example, for multiple register loads, the atomicity size may be the register size. In another example, the vector element size may be the atomicity size for vector load instructions. In yet another example, multiple contiguous vector elements, but fewer than all the vector elements in a vector register, may be the atomicity size for vector load instructions.

17 Claims, 7 Drawing Sheets

(56) References Cited

U.S. PATENT DOCUMENTS

| | | | |
|---|---|---|---|
| 10,141,033 B2* | 11/2018 | Hinton | G06F 9/30163 |
| 10,146,538 B2 | 12/2018 | Sade et al. | |
| 10,153,011 B2* | 12/2018 | Hinton | G06F 9/30043 |
| 10,153,012 B2* | 12/2018 | Hinton | G11C 7/1036 |
| 10,163,468 B2* | 12/2018 | Hinton | G11C 7/1036 |
| 10,170,165 B2* | 1/2019 | Hinton | G11C 7/1036 |
| 10,228,951 B1 | 3/2019 | Kothari et al. | |
| 11,119,767 B1* | 9/2021 | Mestan | G06F 9/3824 |
| 11,119,920 B2* | 9/2021 | Ros | G06F 3/0604 |
| 11,314,509 B2* | 4/2022 | Abhishek Raja | G06F 9/3865 |
| 2005/0149703 A1 | 7/2005 | Hammong et al. | |
| 2005/0223201 A1* | 10/2005 | Tremblay | G06F 9/3863 |
| | | | 712/E9.05 |
| 2009/0019231 A1 | 1/2009 | Cypher et al. | |
| 2010/0250850 A1* | 9/2010 | Yang | G06F 9/3826 |
| | | | 711/155 |
| 2010/0262781 A1 | 10/2010 | Hruseky et al. | |
| 2012/0173848 A1* | 7/2012 | Sun | G06F 9/3834 |
| | | | 712/205 |
| 2012/0290791 A1* | 11/2012 | Yang | G06F 9/3826 |
| | | | 711/E12.017 |
| 2015/0006848 A1* | 1/2015 | Hinton | G06F 9/30109 |
| | | | 712/27 |
| 2015/0067230 A1* | 3/2015 | Avudaiyappan | G06F 9/3834 |
| | | | 711/3 |
| 2015/0248294 A1* | 9/2015 | Singh | G06F 12/0888 |
| | | | 711/138 |
| 2016/0358636 A1* | 12/2016 | Hinton | G06F 9/30043 |
| 2018/0033468 A1* | 2/2018 | Hinton | G06F 9/30109 |
| 2018/0122429 A1* | 5/2018 | Hinton | G06F 9/30043 |
| 2018/0122430 A1* | 5/2018 | Hinton | G11C 7/1036 |
| 2018/0122431 A1* | 5/2018 | Hinton | G06F 9/30043 |
| 2018/0122432 A1* | 5/2018 | Hinton | G06F 9/30163 |
| 2018/0122433 A1* | 5/2018 | Hinton | G11C 7/1036 |
| 2018/0307492 A1 | 10/2018 | Di | |
| 2021/0294607 A1* | 9/2021 | Abhishek Raja | G06F 9/3855 |
| 2022/0091846 A1* | 3/2022 | Mestan | G06F 9/3004 |

* cited by examiner

Computer Accessible Storage Medium 200

SOC 204

FIG. 9

DECOUPLING ATOMICITY FROM OPERATION SIZE

BACKGROUND

Technical Field

Embodiments described herein are related to processors and, more particularly, to handling ordering in processors to meet memory consistency model requirements.

Description of the Related Art

Processors achieve high performance by, among other things, executing instructions out of program order when possible. For most arithmetic/logic (ALU) type instructions, branch instructions, and other non-memory instructions, execution may be in any order that produces the same result as if the instructions were executed in program order. Instruction set architectures (ISAs) also including memory instructions/operations such as load and store instructions to read and write memory, respectively, in most ISAs, or instructions with a memory operand in other ISAs. For memory instructions/operations, the ordering model (or memory consistency model) is somewhat more complex because the results of writing memory are visible to other threads at some point (e.g. threads executing on other processors, in a multi-processor environment). The memory consistency model specifies the set of acceptable outcomes for the visibility of stores within and between threads. The memory consistency model is also referred to herein more briefly as the memory model, the memory ordering model, or the ordering model herein.

In the strictest ordering model (sequential consistency), all memory instructions must appear to have been executed in program order. Other ordering models are more relaxed. For example, in total store ordering (TSO), a processor can move its own reads ahead of its own writes, but a given write must be visible (e.g. become the result of a read) to all processors at the same logical point in time. One requirement to ensure TSO or other, stricter memory models is that a given read receives its bytes from the same source (e.g. a store in the store queue, or the cache or main memory). When the same-source requirement is satisfied for a given read, the given read receives all of its bytes logically either before a given write is performed or after the given write is performed. If a mix of bytes from more than one source are permitted, then a given read could observe an incorrect order over multiple writes.

Another performance-enhancing technique is the fusion of instructions. For example, some ISAs support a load instruction that writes multiple registers (e.g. the load pair instructions in the ARM ISA, load multiple or load string instructions in the Power ISA, etc.). Because such load instructions have a larger operation size, they are less likely to obtain all their bytes from a single source in a processor that implements a store queue. Similarly, vector instructions often have a large operation size to support a significant number of vector elements in a vector register (e.g. 128 bits, 256 bits, 512 bits, etc.). Performance of multiple register loads or vector loads suffer due to slower execution to maintain atomicity for stricter ordering models such as TSO.

SUMMARY

In an embodiment, a processor implements a different atomicity size (for memory consistency order) than the operation size. More particularly, the processor may implement a smaller atomicity size than the operation size. For example, for multiple register loads, the atomicity size may be the register size. In another example, the vector element size may be the atomicity size for vector load instructions. In yet another example, multiple contiguous vector elements, but fewer than all the vector elements in a vector register, may be the atomicity size for vector load instructions. For cases in which the data for each atomic element of the operation is sourced from one source (e.g. the store queue or the cache/memory), the atomicity of the load may be satisfied and thus the load may complete without retry or flush. Performance of the processor when executing such loads may be improved, in an embodiment.

BRIEF DESCRIPTION OF THE DRAWINGS

The following detailed description makes reference to the accompanying drawings, which are now briefly described.

FIG. 9 is a block diagram of one embodiment of a computer accessible storage medium While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean "including, but not limited to." As used herein, the terms "first," "second," etc. are used as labels for nouns that they precede, and do not imply any type of ordering (e.g., spatial, temporal, logical, etc.) unless specifically stated.

Figure 1:
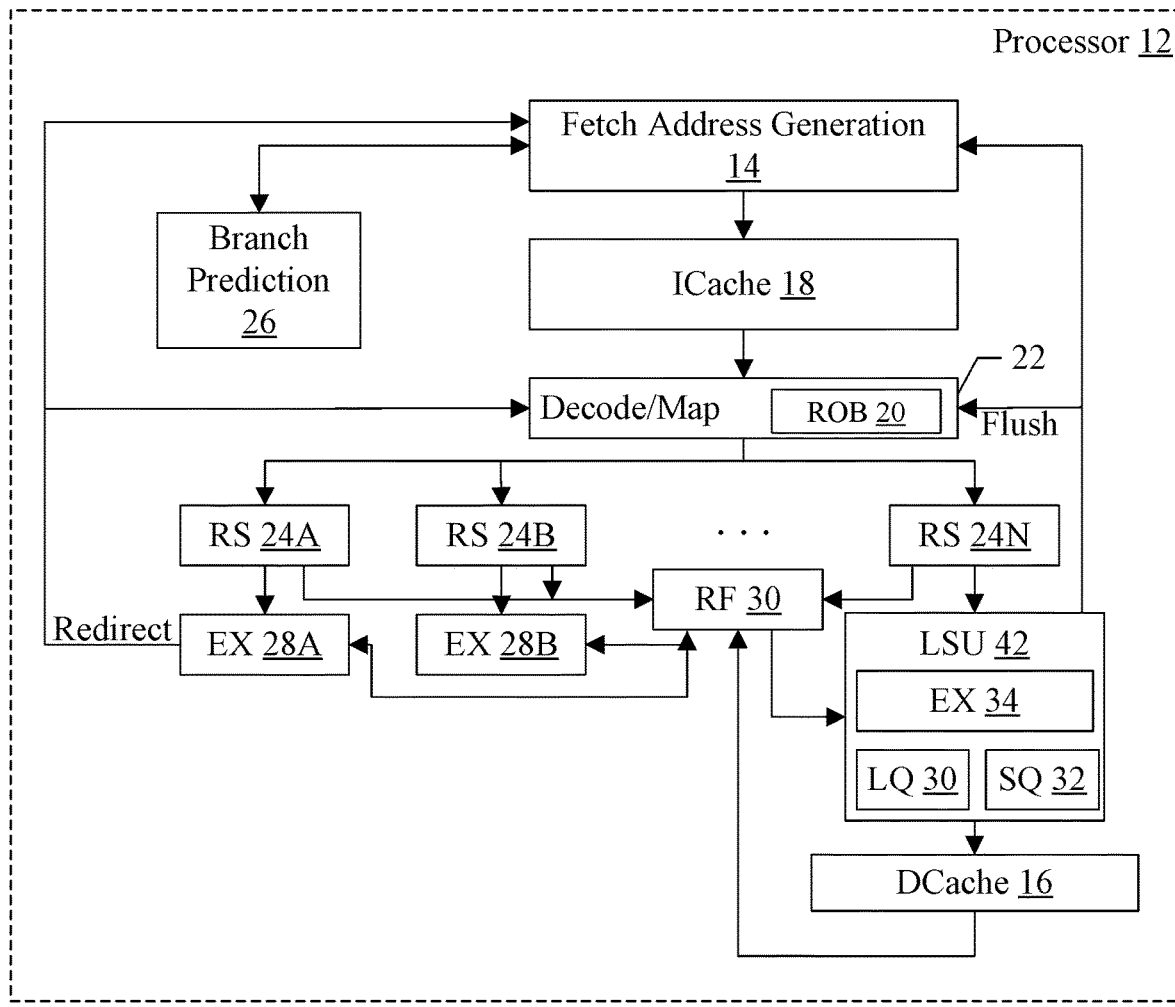
FIG. 1 is a block diagram of a processor.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be said to be "configured" to perform that function.

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

This specification may use the words "a" or "an" to refer to an element, or "the" to refer to the element. These words are not intended to mean that there is only one instance of the element. There may be more than one in various embodiments. Thus, "a", "an", and "the" should be interpreted to mean "one or more" unless expressly described as only one.

This specification may describe various components, units, circuits, etc. as being coupled. In some embodiments, the components, units, circuits, etc. may be coupled if they are electrically coupled (e.g. directly connected or indirectly connected through one or more other circuits) and/or communicatively coupled.

DETAILED DESCRIPTION OF EMBODIMENTS

Turning now to FIG. 1, a block diagram of one embodiment of a processor 12 is shown. In the illustrated embodiment, the processor 12 includes a fetch address generation circuit 14, an instruction cache ("ICache") 18, a decode/map unit 22 (including a reorder buffer (ROB) 20), a branch prediction unit 26, one or more reservation stations 24A-24N, one or more execution units 28A-28B, a register file 30, a data cache ("DCache") 16, and a load/store unit (LSU) 42. The LSU 42 includes a load queue (LQ) 30, a store queue (SQ) 32, and an execution circuit 34 coupled to the LQ 30 and the SQ 32.

The fetch address generation circuit 14 is coupled to the ICache 18, which is coupled to the decode/map unit 22, which is coupled to the reservation stations 24A-24N. The reservation stations 24A-24B are coupled to the execution units 28A-28B as shown in FIG. 1, and the reservation station 24N is coupled to the LSU 42. The reservation stations 24A-24N are also coupled to the register file 30, which is coupled to the execution units 28A-28B and the LSU 42. The LSU 42 is also coupled to the DCache 16, which is coupled to the register file 30. The branch prediction unit 26 is coupled to the fetch address generation circuit 14. One or more of the execution units 28A-28B may be coupled to provide a redirect to the fetch address generation circuit 14 and the decode/map unit 22 (e.g. in the event of a branch misprediction or other microarchitectural exception, in an embodiment). The LSU 42 may provide a flush indication to the fetch address generation circuit 14 and the decode/map unit 22 in the illustrated embodiment. Alternatively, the flush indication may be provided to the decode/map unit 22, which may flush the ops after the flush point and provide a refetch address to the fetch address generation circuit 14.

As discussed in more detail below, the LSU 42 may be configured to execute load/store ops, including enforcing the memory ordering model implemented by the processor 12. In an embodiment, the processor 12 may implement a TSO model, or may have one or more modes in which TSO is implemented and one or more other modes in which other memory ordering models are implemented (e.g. the native ordering model of the ISA implemented by the processor 12). However, the processor 12 may employ an atomicity size that is smaller than the operation size for some memory operations. For example, with multiple register load ops, the atomicity size may be implemented as the register size. That is, each register targeted by the load may obtain each of the bytes accessed by the load and written to that register from a single source (e.g. a store in the store queue 32, or a cache line in the DCache 16). If a register has more than one source, the load may be retried and may wait until the preceding stores have drained from the store queue 32. In an embodiment, the load queue 30 may include functionality to hold the load until the store queue 32 has drained, or until the stores that are hit by the load have drained, before retrying the load. In other embodiments, the load may be periodically retried until the registers are successfully sourced from a single source. Accordingly, the LSU 42 may permit forwarding of partial data from the store queue for the operation size as long as each register obtains all the bytes written to the register from a single source (e.g. a store in the store queue 32, or a cache line in the DCache 16)

In some cases, compilers have used multiple register loads to fuse logically distinct loads into one instruction. Thus, each load is dependent on a different store operation (and often, the stores remain distinct instructions, rather than being fused as a multiple register store instruction). By defining the atomicity size to be the register size, and thus the atomic elements are the registers that are the target of a multiple register load, the correct program operation may be observed while improving performance for the multiple register loads, in an embodiment.

In an embodiment, vector load operations may be implemented with a smaller atomicity size than operation size. A vector load may access multiple vector elements of a vector (e.g., a given vector register may have multiple vector elements in it). The vector registers may be wide, e.g., 128 bytes, 256 bytes, 512 bytes, or larger. The number of vector elements in the vector depends on the size of the vector register and the vector element size, which may be one byte, two bytes, four bytes, etc. In an embodiment, the atomicity size may be the size of one vector element. In another embodiment, the atomicity size may be multiple vector elements, but fewer than all vector elements in the vector register. For example, a given atomic element in the vector register may be multiple vector elements (such as adjacent vector elements in the register). In still another embodiment, the vector register may define the atomicity size, similar to other registers above.

In an embodiment, both the multiple register loads and the vector loads may be implemented with the atomicity size smaller than the operation size. In other embodiments, only the multiple register loads may implement the atomicity size smaller than the operation size. In still other embodiments, only the vector loads may implement the atomicity size smaller than the operation size.

The operation size, in this context, may refer to the total number of bytes that are accessed by the memory op. In contrast, the atomicity size may be the total number of bytes that are atomically accessed. That is, the atomic access either reflects the effects of a given store in all its bytes or does not reflect the effects of the given store. One requirement to meet the atomicity property is that the bytes are accessed from a single source, as mentioned above. The atomicity size may be an integer greater than one, specifying a plurality of bytes, in an embodiment (as a byte may be atomically accessed by definition, since it is the smallest unit of memory). More particularly, the atomicity size of a load/store operation may be a value between one byte and the operation size. The atomicity size may define the smallest granularity which the LSU 42 may use in determining the single-source criteria required by TSO and other strict memory consistency models. Allowing multiple atomic units within a larger operation size may permit the LSU 42 to have a different single-source for each atomic unit without violating TSO or other strict memory consistency models. The operation size may be another integer larger than the atomicity size (and may be an integer multiple of the atomicity size, and more particularly a power of two multiple of the atomicity size).

If a DCache miss is detected for a load, the data source may actually be another level of cache or the main memory itself. The DCache 16 may be loaded with the data concurrent with its forwarding to the targeted load register. Atomicity may be measured in the same way as a DCache hit for such cases. Atomicity may be measured in the same way even if the DCache 16 is not updated with the data (e.g. for a non-cacheable access).

The fetch address generation circuit 14 may be configured to generate fetch addresses (fetch PCs) to fetch instructions from the ICache 18 for execution by the processor 12. The fetch address generation circuit 14 may implement various prediction structures to predict the fetch path. For example, a next fetch predictor may be used to predict fetch addresses based on previously executed instructions. In such an embodiment, the branch prediction unit 26 may be used to verify the next fetch prediction. Alternatively, the branch prediction unit 26 may be used to predict next fetch addresses if the next fetch predictor is not used.

The branch prediction unit 26 may include one or more branch predictors such as a brand direction predictor, an indirect branch predictor, and a return address stack predictor. Various embodiments may include any subset of the above branch predictors and/or other predictors. The branch direction predictor may be configured to predict the taken/not taken result for conditional branches. Based on the taken/not taken result, the next fetch address may be either the branch target address or the next sequential address. The target address may be the address specified by the branch instruction (or more briefly, branch) to which fetching is to be directed when the branch is taken (or is always the location to which fetching is to be directed, for unconditional branches). The next sequential address may be the address that numerically follows the PC of the branch, and may be the next fetch address if the branch is not taken (similar to non-branch instructions, which are fetched in sequential order). The return address stack may predict the fetch addresses for return instructions, based on previous call instructions. The call and return instructions may be used, e.g. to call and return from subroutines/functions, etc. The call instruction may push a return address on the stack (e.g. to the next sequential instruction after the call), and the return instruction may pop the top of the stack to generate the return address. The stack may be in memory, or may be simulated via a register written by the call instruction and read by the return instruction. The indirect branch predictor may predict the target address of an indirect branch instruction. In an embodiment, the indirect branch predictor may be a Tagged Geometric (TAGE)-style branch predictor which has multiple memories. A base memory may be indexed by the PC or a hash of the PC, and other memories may be indexed by the PC hashed with different amounts of branch history. The base memory may not be tagged, but the other memories may be tagged. If a tag hit is detected in one or more of the other memories, the branch target address may be predicted to be the target address from the memory that is indexed with the largest amount of history and that is also a tag hit for the branch. If no tag hit is detected, the branch target address may be predicted to be the target address from the base memory. Other embodiments may implement other types of indirect branch predictors. For example, a single table indexed by branch PC and branch history, or simply branch PC, may be used. A single tagged table may be used.

The decode/map unit 22 may be configured to decode the fetched instructions from the ICache 18 into instruction operations. In some embodiments, a given instruction may be decoded into one or more instruction operations, depending on the complexity of the instruction. Particularly complex instructions may be microcoded, in some embodiments. In such embodiments, the microcode routine for the instruction may be coded in instruction operations. In other embodiments, each instruction in the instruction set architecture implemented by the processor 12 may be decoded into a single instruction operation, and thus the instruction operation may be essentially synonymous with instruction (although it may be modified in form by the decoder). The term "instruction operation" may be more briefly referred to herein as "op."

The decode/map unit 22 may be configured to map the ops to speculative resources (e.g. physical registers) to permit out-of-order and/or speculative execution, and may dispatch the ops to the reservation stations 24A-24N. The ops may be mapped to physical registers in the register file 30 from the architectural registers used in the corresponding instructions. That is, the register file 30 may implement a set of physical registers that may be greater in number than the architected registers specified by the instruction set architecture implemented by the processor 12. The decode/map unit 22 may manage the mapping of the architected registers to physical registers. There may be separate physical registers for different operand types (e.g. integer, vector, floating point, etc.) in an embodiment. In other embodiments, the physical registers may be shared over operand types. The decode/map unit 22 may also be responsible for tracking the speculative execution and retiring ops or flushing misspeculated ops. The ROB 20 may be used to track the program order of ops and manage retirement/flush, for example.

Ops may be scheduled for execution when the source operands for the ops are ready. In the illustrated embodiment, decentralized scheduling is used for each of the execution units 28A-28B and the LSU 42, e.g. in the reservation stations 24A-24N. Other embodiments may implement a centralized scheduler if desired. Scheduled ops may read their source operands from the register file 30 and/or may have operands forwarded from previous ops executed by the execution units 28A-28B and/or LSU 42. The results of ops that have target registers may be written to the register file 30 and/or forwarded to dependent ops.

The LSU 42 may be configured to execute load/store memory ops. Generally, a memory operation (memory op) may be an instruction operation that specifies an access to memory (although the memory access may be completed in a cache such as the data cache 16). A load memory operation may specify a transfer of data from a memory location to a register, while a store memory operation may specify a transfer of data from a register to a memory location. Load memory operations may be referred to as load memory ops, load ops, or loads; and store memory operations may be referred to as store memory ops, store ops, or stores. In an embodiment, store ops may be executed as a store address op and a store data op. The store address op may be defined to generate the address of the store, to probe the cache for an initial hit/miss determination, and to update the store queue 32 with the address and cache info. Thus, the store address op may have the address operands as source operands. The store data op may be defined to deliver the store data to the store queue. Thus, the store data op may not have the address operands as source operands, but may have the store data operand as a source operand. In many cases, the address operands of a store may be available before the store data operand, and thus the address may be determined and made available earlier than the store data. In some embodiments, it may be possible for the store data op to be executed before the corresponding store address op, e.g. if the store data operand is provided before one or more of the store address operands. While store ops may be executed as store address and store data ops in some embodiments, other embodiments may not implement the store address/store data split.

The execution circuit 34 in the LSU 42 may execute the load/store ops issued by the reservation station 24N. The execution circuit 34 may access the data cache 16 to determine hit/miss for the load/store ops, and to forward data for loads. The execution circuit 34 may check the store queue 32 for ordering issues with loads being executed, as well as to forward data from a store or stores in the store queue 32 for a load that is younger than the store or stores and matches the address of the store(s) in the store queue 32. Similarly, the execution circuit 34 may check the load queue 30 to detect ordering issues for a store being executed. When ordering issues are detected, if the op being executed is the op that needs to finish later than an op in one of the queues 30-32, an internal retry of the op may be used to properly order the ops. If the op in the queue 30-32 needs to finish later than an op that is being executed, a flush is often needed (e.g. if a load has forwarded data and is in the load queue 30, and an older store executes and updates the same data or a portion of the data, then incorrect data has been forwarded).

The store queue 32 may queue store ops that have been executed (e.g. probed the cache) and are awaiting commit to the data cache (e.g. once a given store op is retired, or ready to be retired, in various embodiments). The LSU 42/execution circuit 34 may forward data from the store queue 32 for younger load ops. In the case that the store has an address matching the load address but does not have data available, the LSU 42/execution circuit 34 may retry the load based on the store queue 32 match and wait for store data to become available. The store queue 32 may also be used to detect ordering issues with loads.

Similarly, the load queue 30 may queue load ops that have been executed. The load queue 30 may include load ops that have been retried and are to be executed again, either as soon as possible or after occurrence of a subsequent event related to the reason that the retry was detected. The load queue 30 may also be used by the LSU 42 to detect ordering issues with stores, so that loads that have completed (e.g. irreversibly forwarded data to a target) and have an ordering issue may be flushed. The ordering issues detected using the load queue 30 and the store queue 32 may include memory ordering model issues and/or issues related to the coherence of memory locations that are read by load ops and written by store ops in the same thread or code sequence being executed by the processor 12.

The execution units 28A-28B may include any types of execution units in various embodiments. For example, the execution units 28A-28B may include integer, floating point, and/or vector execution units. Integer execution units may be configured to execute integer ops. Generally, an integer op is an op which performs a defined operation (e.g. arithmetic, logical, shift/rotate, etc.) on integer operands. Integers may be numeric values in which each value corresponds to a mathematical integer. The integer execution units may include branch processing hardware to process branch ops, or there may be separate branch execution units.

Floating point execution units may be configured to execute floating point ops. Generally, floating point ops may be ops that have been defined to operate on floating point operands. A floating point operand is an operand that is represented as a base raised to an exponent power and multiplied by a mantissa (or significand). The exponent, the sign of the operand, and the mantissa/significand may be represented explicitly in the operand and the base may be implicit (e.g. base 2, in an embodiment).

Vector execution units may be configured to execute vector ops. Vector processing may be characterized by performing the same processing on significant amounts of data, where each datum is a relatively small value (e.g. 8 bits or 16 bits, compared to 32 bits to 64 bits for an integer). Thus, vector ops often include single instruction-multiple data (SIMD) or vector operations on an operand that represents multiple data items.

Thus, each execution unit 28A-28B may comprise hardware configured to perform the operations defined for the ops that the particular execution unit is defined to handle. The execution units may generally be independent of each other, in the sense that each execution unit may be configured to operate on an op that was issued to that execution unit without dependence on other execution units. Viewed in another way, each execution unit may be an independent pipe for executing ops. Different execution units may have different execution latencies (e.g., different pipe lengths). Additionally, different execution units may have different latencies to the pipeline stage at which bypass occurs, and thus the clock cycles at which speculative scheduling of dependent ops occurs may vary based on the type of op and execution unit 28 that will be executing the op.

It is noted that any number and type of execution units 28A-28B may be included in various embodiments, including embodiments having one execution unit and embodiments having multiple execution units.

A cache line may be the unit of allocation/deallocation in a cache. That is, the data within the cache line may be allocated/deallocated in the cache as a unit. Cache lines may vary in size (e.g. 32 bytes, 64 bytes, 128 bytes, or larger or smaller cache lines). Different caches may have different cache line sizes. The ICache 18 and DCache 16 may each be a cache having any desired capacity, cache line size, and configuration. There may be more additional levels of cache between the DCache 16/ICache 18 and the main memory, in various embodiments.

At various points, ops are referred to as being younger or older than other ops. A first operation may be younger than a second operation if the first operation is subsequent to the second operation in program order. Similarly, a first operation may be older than a second operation if the first operation precedes the second operation in program order.

Figure 2:
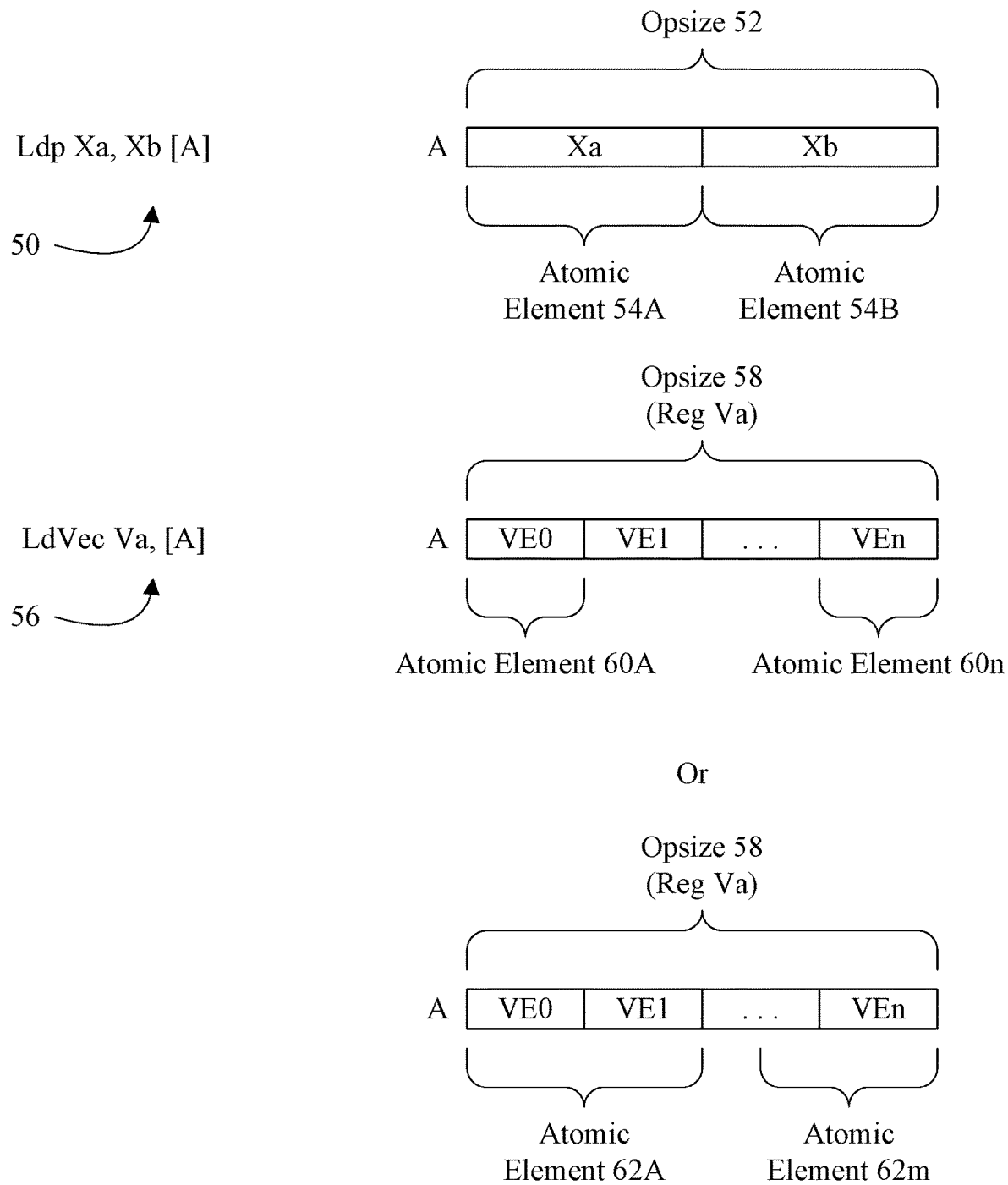
FIG. 2 is a block diagram illustrating decoupled atomicity and operation size for an embodiment.

Turning now to FIG. 2, a block diagram illustrating decoupled operation size and atomicity size, for one embodiment, is shown. At the top of FIG. 2, a load pair instruction (Ldp) is illustrated (reference numeral 50). The load pair instructions have register targets Xa and Xb, and one or more source operands the specify the memory address read by the load pair instruction (e.g. address A in this example). Thus, the operation size of the load pair instruction (Opsize 52 in FIG. 2) is twice the register width. The atomicity size, on the other hand, may be the register width and thus there are two atomic elements 54A-54B in the data at address A, for this example. Xa and Xb need not be adjacent registers in the register file (e.g. the load pair instruction may support specifying the register addresses for Xa and Xb separately). Other multiple register load instructions may support more than two register targets and thus may have more than two atomic elements, in an embodiment.

Also illustrated in FIG. 2 is a vector load instruction (LdVec, reference numeral 56). The vector load instruction has a target vector register Va, and the width of the vector register is the operation size (Opsize 58 in FIG. 2). In this example, the vector element size may be the atomicity size, and thus each vector element may be an atomic element (reference numerals 60A-60n). Alternatively, multiple adjacent vector elements may be atomic elements. For example, at the bottom of FIG. 2, two adjacent vector elements are an atomic element (reference numerals 62A-62m). Other embodiments may have other numbers of adjacent vector elements as an atomic element.

Figure 3:
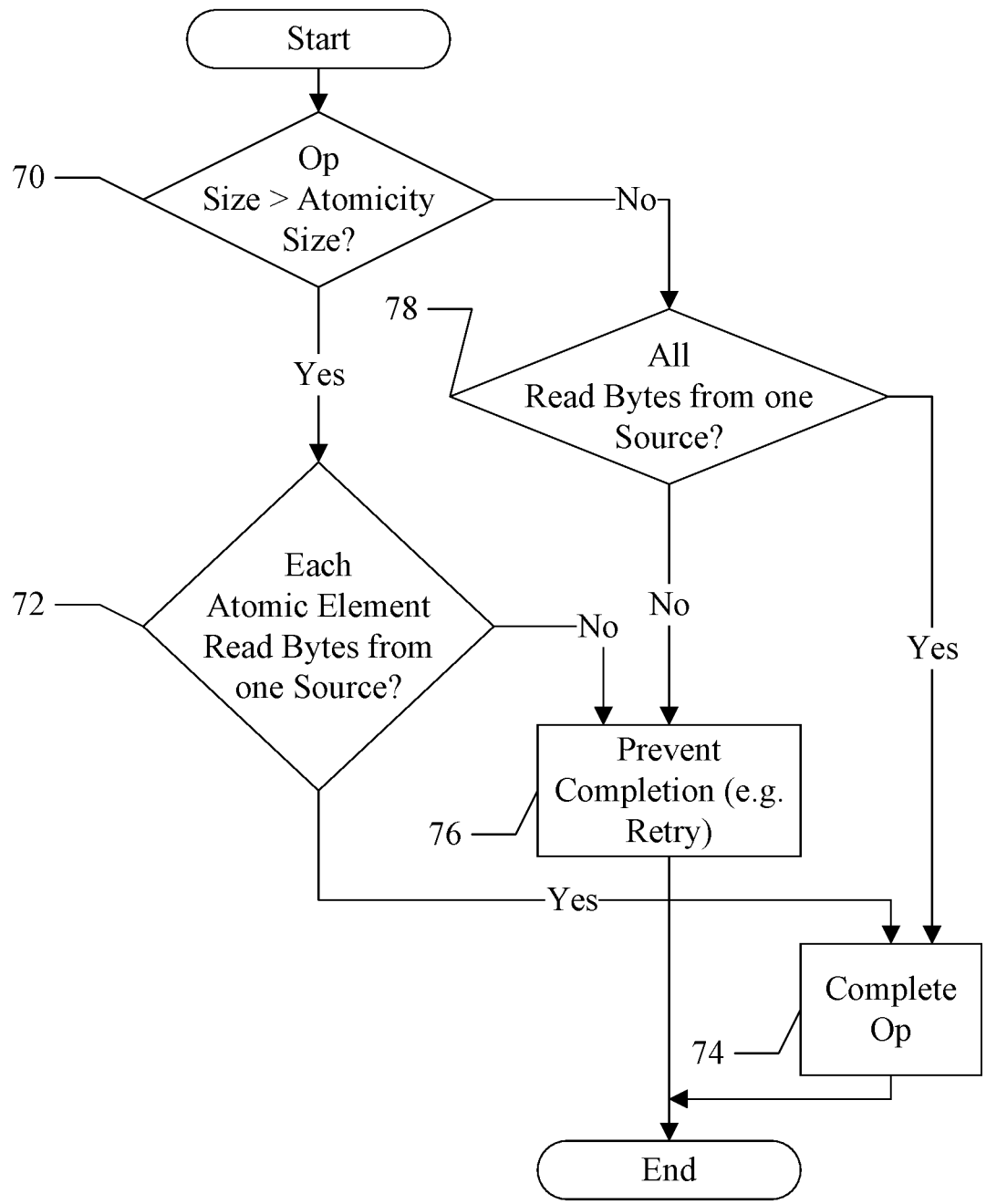
FIG. 3 is a flowchart illustrating operation of one embodiment of a processor during execution of a load operation.

FIG. 3 is a flowchart illustrating operation of one embodiment of the LSU 42 (and more particularly the execution circuit 34, in an embodiment) to perform a load. While the blocks are shown in a particular order for ease of understanding, other orders may be used. Blocks may be performed in parallel in combinatorial logic circuitry within the LSU 42/execution circuit 34. Blocks, combinations of blocks, and/or the flowchart as a whole may be pipelined over multiple clock cycles. The LSU 42/execution circuit 34 may be configured to implement the operation illustrated in FIG. 3.

If the load has an operation size greater than atomicity size (decision block 70, "yes" leg), the LSU 42 may attempt the load and determine if each atomic element (of the plurality of atomic elements within the operation) received its bytes from a single source (decision block 72). Different atomic elements may obtain their bytes from different sources, as long as each atomic element has a single source. If each atomic element obtained its bytes from one source (decision block 72, "yes" leg), the LSU 42 may complete the load op (block 74). Completing the load op may include forwarding results to the target register(s) of the load and reporting status to the ROB 20 for eventual retirement. If at least one atomic element has multiple sources for its bytes (decision block 72, "no" leg), the LSU 42 may prevent completion (e.g. retrying the load) (block 76). The load may be reattempted at a later time (e.g. reissuing from the load queue 30). In an embodiment, the LSU 42 may tag the retried load with the store on which it depends for some (but not all) of its bytes, to control when the reissue is performed. In another embodiment, the LSU 42 may reissue the load periodically until it completes successfully. On the other hand, if the load has and operation size equal to the atomicity size (decision block 70, "no" leg), the LSU 42 may determine if all bytes of the operation size have a single source (decision block 78). If so (decision block 78, "yes" leg), the LSU 42 may complete the load op (block 72). If not (decision block 78, "no" leg), the LSU 42 may prevent completion (block 76). In an embodiment, TSO (or a stricter ordering model) may be implemented in one or more modes of the processor 12, and a looser ordering model may be implemented in other modes. In such embodiments, decision blocks 70 and 72 may be conditional based on the mode(s) that implement the stricter ordering model being active.

While the multiple register loads and/or vector loads may have a smaller atomicity size than operation size, the memory ordering model may still require that the atomic elements appear to have been read in order. For example, in the multiple register load case, the first-listed register in the instruction (e.g. Xa) needs to appear to have been read at the same time as, or prior to, the second-listed register in the instruction (e.g. Xb). Thus, if the registers are read from different cache lines or different stores, for example, and one or more of the underlying cache lines are lost prior to the completion of the multiple register load, the ordering may not be guaranteed.

Figure 4:
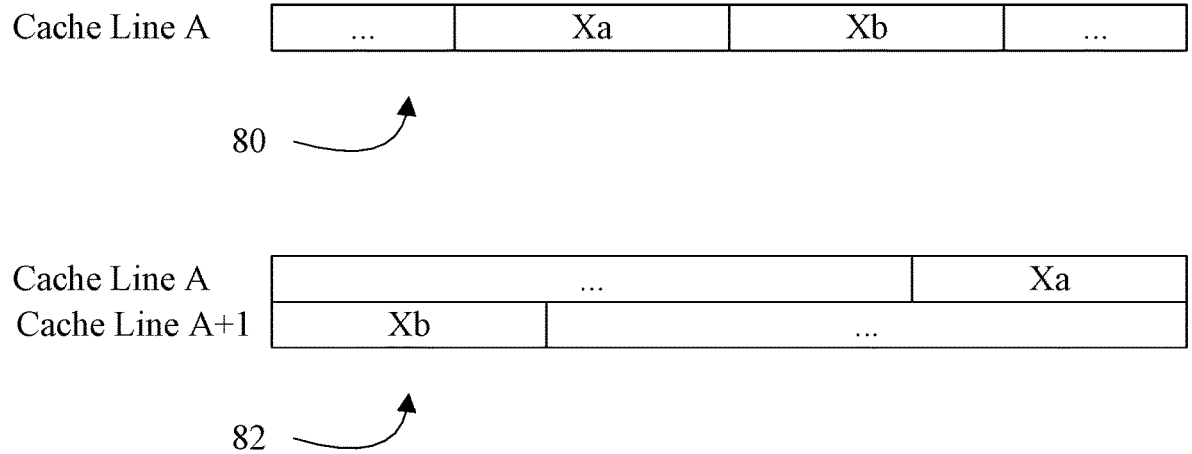
FIG. 4 is a block diagram illustrating exemplary loads that access data within a cache line and across cache lines.

FIG. 4 illustrates two examples. At the top of FIG. 4, both atomic elements of a load pair instruction are in the same cache line (the cache line including address A, reference numeral 80). Accordingly, the atomic elements of the load pair instruction appear to complete at the same time, thus in order. On the other hand, at reference numeral 82, one of the atomic elements (register Xa) is read from the cache line containing address A and another of the atomic elements (register Xb) is read from the next consecutive cache line (labeled A+1). If the cache line including Xa is invalidated (e.g. due to a store by another processor or other coherent agent), the order of Xa and Xb could be observed to be Xb before Xa, which does not comply with the TSO model. Accordingly, in an embodiment, the processor 12 may include circuitry to check for these conditions and ensure correct operation.

Figure 5:
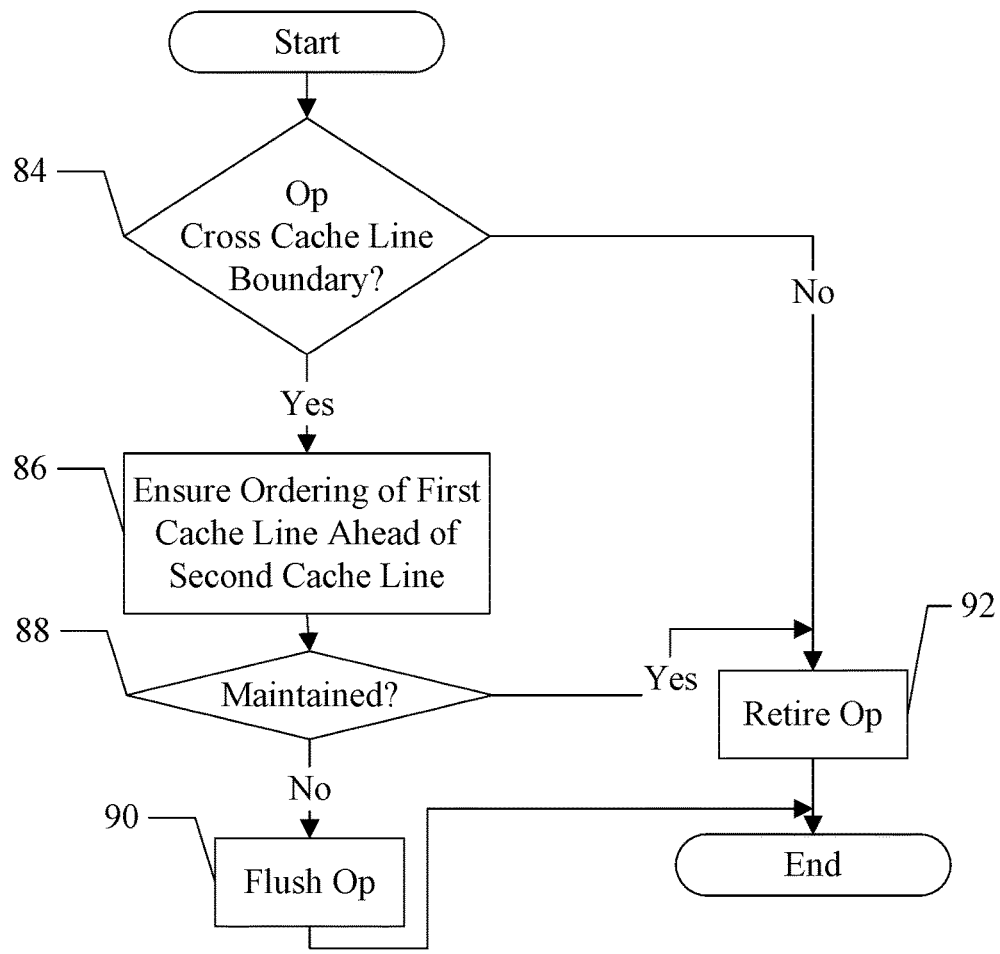
FIG. 5 is a flowchart illustrating operation of one embodiment of a processor to ensure load order for a cross-cache-line access.

FIG. 5 is a flowchart illustrating operation of one embodiment of the LSU 42 (and more particularly the execution circuit 34, in an embodiment) to ensure ordering of loads that have multiple atomic elements. While the blocks are shown in a particular order for ease of understanding, other orders may be used. Blocks may be performed in parallel in combinatorial logic circuitry within the LSU 42/execution circuit 34. Blocks, combinations of blocks, and/or the flowchart as a whole may be pipelined over multiple clock cycles. The LSU 42/execution circuit 34 may be configured to implement the operation illustrated in FIG. 5.

If the operation size and address accessed by the load causes a crossing of a cache line boundary (and thus one or more atomic elements of the load may exist in one cache line while other atomic elements exist in a different cache line) (decision block 84, "yes" leg), the LSU 42 may monitor the cache lines and ensure the ordering is maintained between the cache lines, such the first cache line is accessed ahead of the second cache line (e.g. the first cache line is not invalidated while the second cache line remains in the cache). If ordering is not maintained (decision block 88, "no" leg), the LSU 42 may flush the load op and dependent ops, which may be refetched and reexecuted (block 90). If ordering is maintained (decision block 88, "yes" leg), the op may remain completed and may retire (block 92).

In some embodiments, the processor 12 may simplify more complex load instructions by decoding/microcoding the load instructions into multiple load ops that perform portions of the load instruction. For example, the wide vector load instructions such as those described above may be microcoded as multiple smaller loads so that the data paths in the processor need not be as wide as the vector register. The multiple load ops may still take advantage of the decoupling of the operation size and the atomicity size, if applicable at the size of the smaller loads. Additionally, however, the multiple load ops may need to appear to be executed in order to comply with the TSO model. One way to implement the ordering would be to execute the load ops that correspond to the complex load instruction in order. However, such an implementation would involve additional hardware to detect that the load ops are microcoded from the same load instruction and to ensure that they remain order, and would incur performance penalties that are unnecessary in cases in which out of order execution would appear to have been in order to observers. Another issue that may occur is livelock, if a younger load in the microcoded sequence causes an older load in the sequence to flush due to order issues and the flush repeats itself (e.g. due to another processor being livelocked on the same addresses).

In an embodiment, the processor 12 (and more particularly the LSU 42) may be configured to permit load ops that are microcoded from the same load instruction to execute out of order. The LSU 42 may flush the load ops if the ordering issue is encountered after the load ops are executed, and the ROB 20 may detect that the load op is part of a microcoded sequence. If the load is near the head of the ROB 20, then the number of reasons that a flush could have occurred (other than the livelock case) is reduced. Using nearness to the head of the ROB as a heuristic, the ROB 20 may signal that the refetched load instruction (and its microcoded load ops) are to be executed in order. The load ops may be flagged as in-order to the LSU 42, which may force the in-order execution of the load ops. Further flushes may be avoided.

Figure 6:
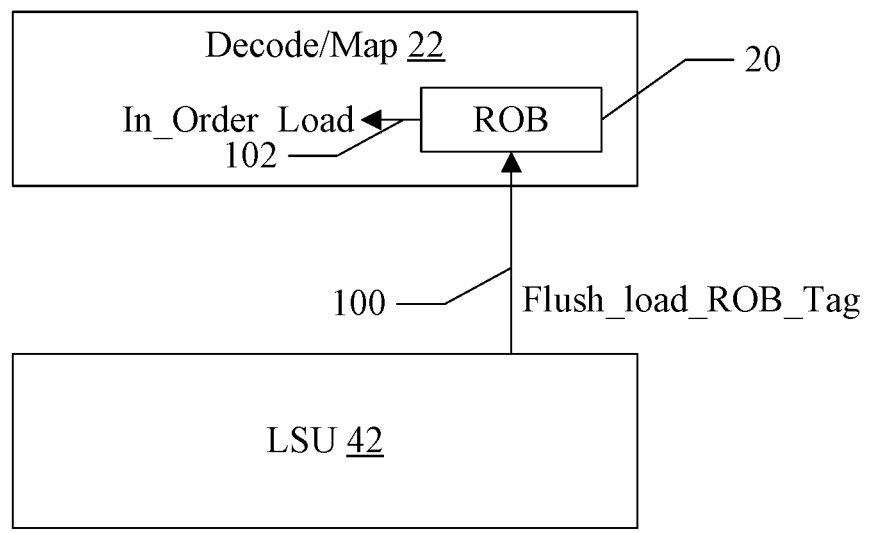
FIG. 6 is a block diagram of one embodiment of a load/store unit and a decode/map unit including a reorder buffer (ROB).

FIG. 6 is a block diagram illustrating one embodiment of the LSU 42 and the decode/map unit 22 (including the ROB 20). The LSU 42 may signal the decode/map unit 22 when a flush of a load is needed (reference numeral 100). For example, the LSU 42 may provide a reorder buffer tag (Flush_Load_ROB_Tag) associated with the load being flushed to the ROB 20. The ROB 20 may flush the load and any subsequent ops, and may cause the ops to be refetched by the fetch address generation circuit 14. Various speculative state may be recovered to the flush point as well.

The ROB 20 may receive the reorder buffer tag, perform the flushing, and cause the speculative state recovery. Additionally, if the reorder buffer tag identifies an entry that is near the head of the ROB 20 (where the head of the ROB 20 is the oldest instruction represented in the ROB 20), the ROB 20 may signal that the load instruction should be executed in order (In_Order_Load, reference numeral 102 in FIG. 6). The entry may be near the head of the ROB 20 if it is within a threshold number of entries of the head (e.g. N entries, where N is an integer greater than one). The number of entries ("N") may be programmable in the ROB 20, or may be fixed in hardware, in various embodiments. The number of entries may be specified in other fashions as well (e.g. percentage of the entries).

The In_Order_Load indication may be provided to other circuitry in the decode/map unit 22. For example, the decoders may receive the load instruction that has been flushed when it is refetched by the fetch address generation circuit 14 from the ICache 18. The decoders may decode the load instruction into two or more microcoded load ops, and may tag the load ops with the In_Order_Load indication to force the load ops to execute in order. The reservation station 24N may use the indication to prevent issuance of the loads until they are oldest in the reservation station 24N, for example.

Figure 7:
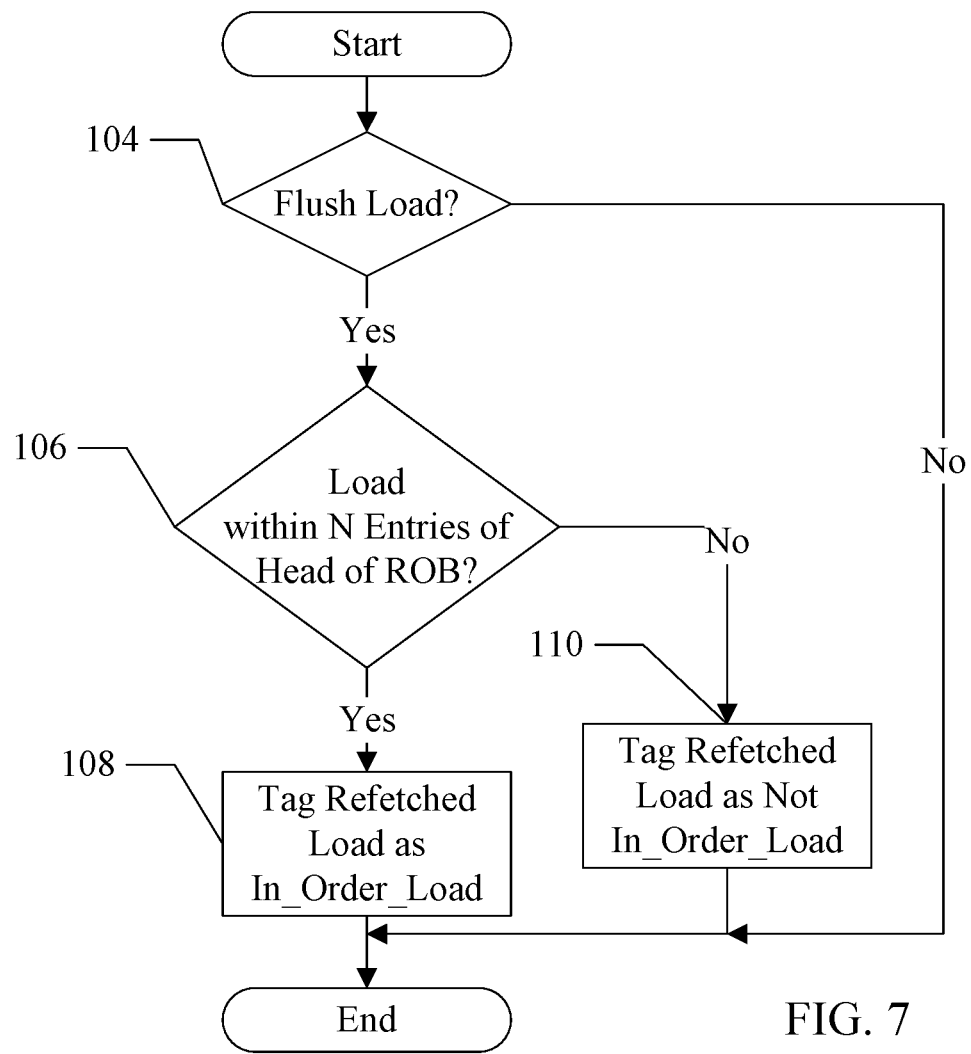
FIG. 7 is a flowchart illustrating operation of one embodiment of a processor to implement in-order load processing for microcoded loads.

FIG. 7 is a flowchart illustrating operation of one embodiment of decode/map unit 22 to tag loads for execution in order. While the blocks are shown in a particular order for ease of understanding, other orders may be used. Blocks may be performed in parallel in combinatorial logic circuitry within the decode/map unit 22. Blocks, combinations of blocks, and/or the flowchart as a whole may be pipelined over multiple clock cycles. The decode/map unit 22 may be configured to implement the operation illustrated in FIG. 7.

If the LSU 42 issues a flush for a load op (decision block 104, "yes" leg), and the load op is within N entries of the head of the ROB 20 (decision block 106, "yes" leg), the decode/map unit 22 may be configured to tag the load ops generated from the refetched load instruction to be executed in-order (block 108). If the LSU 42 issues a flush for a load op (decision block 104, "yes" leg), and the load op is not within N entries of the head of the ROB 20 (decision block 106, "no" leg), the decode/map unit 22 may be configured not to tag the load ops generated from the refetched load instruction to be executed in-order (block 110). That is, the load ops may be executed out of order. If the LSU 42 does not issue a flush for a load op (decision block 104, "no" leg), operation of the decode/map unit 22 continues as normal. As mentioned previously, N may be an integer greater than one and may be fixed or programmable, in various embodiments.

System

Figure 8:
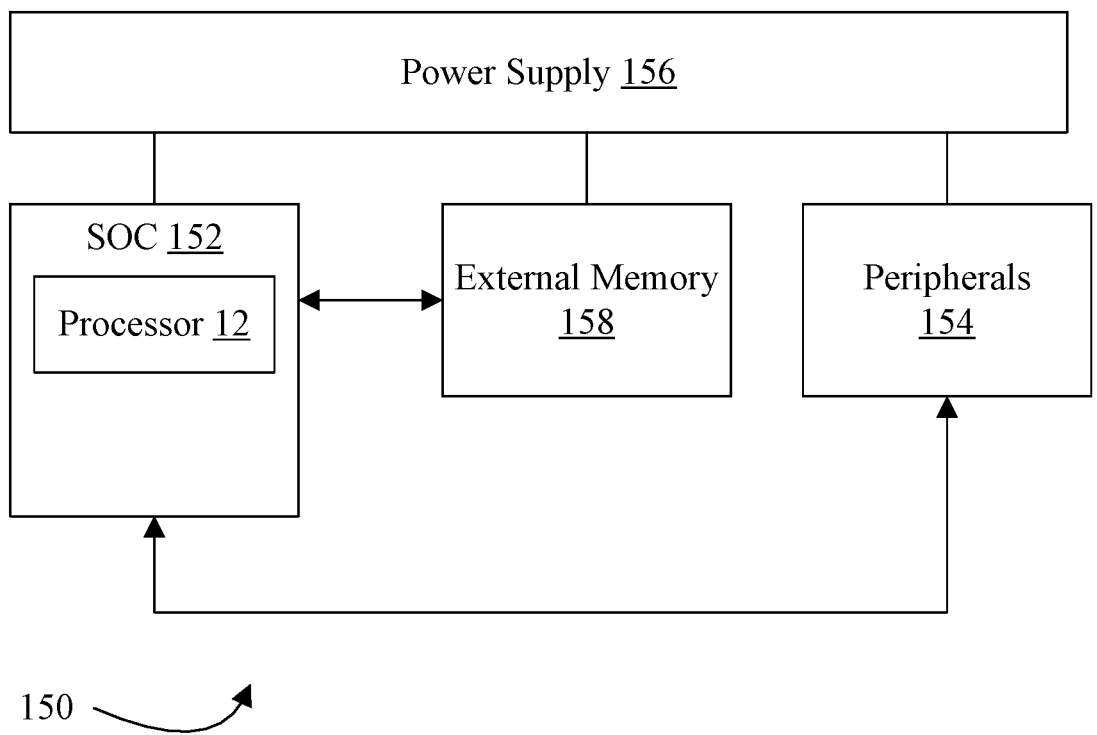
FIG. 8 is a block diagram of one embodiment of a system including the processor shown in FIG. 1.

Turning next to FIG. 8, a block diagram of one embodiment of a system 150 is shown. In the illustrated embodiment, the system 150 includes at least one instance of a system on a chip (SOC) 152 coupled to one or more peripherals 154 and an external memory 158. A power supply 156 is provided which supplies the supply voltages to the SOC 152 as well as one or more supply voltages to the memory 158 and/or the peripherals 154. In some embodiments, more than one instance of the SOC 152 may be included (and more than one memory 158 may be included as well). The SOC 152 may include one or more instances of the processor 12 as illustrated in FIG. 1.

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 158 may include any type of memory. For example, the external memory 158 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 158 may include one or more memory modules to which the memory devices are mounted, such as single inline memory modules (SIMMs), dual inline memory modules (DIMMs), etc. Alternatively, the external memory 158 may include one or more memory devices that are mounted on the SOC 152 in a chip-on-chip or package-on-package implementation.

Computer Readable Storage Medium

Turning now to FIG. 9, a block diagram of one embodiment of a computer readable storage medium 200 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 200 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 200 in FIG. 9 may store a database 204 representative of the SOC 152. Generally, the database 204 may be a database which can be read by a program and used, directly or indirectly, to fabricate the hardware comprising the SOC 152. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the SOC 152. The netlist may then be placed and routed to produce a data set describing geometric shapes to be applied to masks. The masks may then be used in various semiconductor fabrication steps to produce a semiconductor circuit or circuits corresponding to the SOC 152. Alternatively, the database 204 on the computer accessible storage medium 200 may be the netlist (with or without the synthesis library) or the data set, as desired.

While the computer accessible storage medium 200 stores a representation of the SOC 152, other embodiments may carry a representation of any portion of the SOC 152, as desired, including the processor 12, any subset of the processor 12 or portions thereof, etc. The database 204 may represent any portion of the above.

In accordance with the above description, a processor may comprise a data cache and a load/store unit coupled to the data cache and configured to execute memory operations in an embodiment. The load/store unit comprises a store queue configured to queue one or more store memory operations that have been executed and are awaiting commit to the data cache. The load/store unit is configured to access the store queue and the data cache during execution of a load memory operation, wherein the load memory operation has an operation size that specifies an amount of data read by the load memory operation. The load/store unit implements an atomicity size for compliance with a memory ordering model employed by the processor. The atomicity size is smaller than the operation size for the load memory operation. In an embodiment, the operation size may be an integer multiple of the atomicity size. In an embodiment, data read by the load memory operation comprises a plurality of atomic elements of the atomicity size, and an execution of the load memory operation complies with the memory ordering model when each atomic element of the plurality of atomic elements is read from a single source of a plurality of sources. In an embodiment, a cache line in the data cache is one of the plurality of sources. In an embodiment, the load/store unit is configured to ensure ordering of the plurality of atomic elements responsive to the load memory operation receiving bytes from a plurality of cache lines. In an embodiment, a first store memory operation in the store queue is one of the plurality of sources. In an embodiment, the load memory operation targets a plurality of registers. The atomicity size may be a size of the register, and a given atomic element may comprise bytes written into a given register of the plurality of registers. In an embodiment, the load memory operation is a vector load memory operation and the atomicity size is based on a vector element size for vector elements in a vector read by the load memory operation. In an embodiment, the atomicity size is the vector element size, and the plurality of atomic elements are vector elements. In an embodiment, the atomicity size is a multiple of the vector element size, and a given atomic element of the plurality of atomic elements is a plurality of adjacent vector elements. In an embodiment, the processor further comprises a reorder buffer. The load memory operation may be one of a plurality of load memory operations corresponding to a load instruction, and the load/store unit is configured to signal a flush of the load memory operation is an ordering violation is detected. The reorder buffer may be configured to enforce in order execution of the plurality of load memory operations responsive to detecting that the load memory operation is within a threshold number of entries of a head of the reorder buffer when the flush is signaled.

In an embodiment, a load/store unit comprises a store queue configured to queue one or more store memory operations that write data to one or more memory locations and an execution circuit coupled to the store queue. The execution circuit is configured to execute a load memory operation and is configured to detect that the load memory operation reads at least one byte that is written by a first store memory operation represented in the store queue. The load memory operation has a plurality of registers as targets for data read during execution of the load memory operation, and the execution circuit is configured to permit forwarding of data from the first store memory operation in the store queue for the load memory operation in the case that the data from the store queue is partial data for the load memory operation and remaining data for the load memory operation is sourced from a different source than that first store memory operation as long as each register of the plurality of registers obtains a complete set of data from a single source. In an embodiment, the different source is a data cache coupled to the load/store unit. In an embodiment, the execution circuit is configured to execute a vector load memory operation to load a vector having a plurality of vector elements. The execution circuit is configured to permit forwarding of a vector element from the store queue as long as each vector element obtains a complete set of data from a single source. The execution circuit is configured to execute a vector load memory operation to load a vector having a plurality of vector elements, wherein the plurality of vector elements comprises a plurality of atomic elements, and wherein each of the atomic elements comprises a plurality of adjacent vector elements within the plurality of vector elements, wherein the execution circuit is configured to permit forwarding of a given atomic element of the plurality of atomic elements from the store queue as long as each atomic element of the plurality of atomic elements obtains a complete set of data from a single source. In an embodiment, if at least one of the plurality of registers does not receive the complete set of data from the single source, the execution circuit is configured to stall the load memory operation until the store queue empties.

In an embodiment, a method comprises: executing a load memory operation having an operation size; verifying that each of a plurality of atomic elements within data of the operation size are fully sourced from either a store memory operation in a store queue or from a different source; and permitting forwarding from the store queue responsive to the verifying. In an embodiment, the method further comprises executing a second load memory operation having the operation size; detecting that at least one of the plurality of atomic elements within data of the operation size are not fully sourced from either the store memory operation in a store queue or from a different source, but at least one of the plurality of atomic elements is sourced from the store queue; and preventing completion of the second load memory operation from completing. In an embodiment, the preventing is continued until the store queue empties. In an embodiment, the plurality of atomic elements correspond to a plurality of registers targeted by the load memory operation.

Numerous variations and modifications will become apparent to those skilled in the art once the above disclosure is fully appreciated. It is intended that the following claims be interpreted to embrace all such variations and modifications.

What is claimed is:

1. A processor comprising:
   a data cache; and
   a load/store unit coupled to the data cache and configured to execute memory operations, wherein the load/store unit comprises a store queue configured to queue one or more store memory operations that have been executed and are awaiting commit to the data cache, and wherein the load/store unit is configured to access the store queue and the data cache during execution of a load memory operation, wherein the load memory operation has an operation size that specifies an amount of data read by the load memory operation, and wherein the load/store unit implements an atomicity size for compliance with a memory ordering model employed by the processor, wherein the atomicity size is smaller than the operation size for the load memory operation, wherein data read by the load memory operation comprises a plurality of atomic elements of the atomicity size, and wherein an execution of the load memory operation complies with the memory ordering model when a given atomic element of the plurality of atomic elements is read from a single source of a plurality of sources that includes a store memory operation in the store queue and a cache line in the data cache.

2. The processor as recited in claim 1 wherein the operation size is an integer multiple of the atomicity size.

3. The processor as recited in claim 1 wherein the load/store unit is configured to ensure ordering of the plurality of atomic elements responsive to the load memory operation receiving bytes from a plurality of cache lines.

4. The processor as recited in claim 1 wherein the load memory operation targets a plurality of registers, and wherein the atomicity size is a size of a register, and wherein a given atomic element comprises bytes written into a given register of the plurality of registers.

5. The processor as recited in claim 1 wherein the load memory operation is a vector load memory operation and the atomicity size is based on a vector element size for vector elements in a vector read by the load memory operation.

6. The processor as recited in claim 5 wherein the atomicity size is the vector element size, and wherein the plurality of atomic elements are vector elements.

7. The processor as recited in claim 5 wherein the atomicity size is a multiple of the vector element size, and a given atomic element of the plurality of atomic elements is a plurality of adjacent vector elements.

8. The processor as recited in claim 5 further comprising a reorder buffer, and wherein the load memory operation is one of a plurality of load memory operations corresponding to a load instruction, and wherein the load/store unit is configured to signal a flush of the load memory operation if an ordering violation is detected, and wherein the reorder buffer is configured to enforce in order execution of the plurality of load memory operations responsive to detecting that the load memory operation is within a threshold number of entries of a head of the reorder buffer when the flush is signaled.

9. A load/store unit comprising:
a store queue configured to queue one or more store memory operations that write data to one or more memory locations; and
an execution circuit coupled to the store queue and configured to execute a load memory operation having an operation size that is larger than an atomicity size implemented for compliance with a memory ordering model, wherein the execution circuit is configured to detect that the load memory operation reads at least one byte that is written by a first store memory operation represented in the store queue, and wherein the load memory operation has a plurality of registers as targets for data read during execution of the load memory operation, and wherein the execution circuit is configured to permit forwarding of data from the first store memory operation in the store queue for the load memory operation in the case that the data from the store queue is partial data for the load memory operation and remaining data for the load memory operation is sourced from a different source than that first store memory operation as long as each register of the plurality of registers obtains a complete set of data from a single source.

10. The load/store unit as recited in claim 9 wherein the different source comprises a data cache coupled to the load/store unit.

11. The load/store unit as recited in claim 9 wherein the execution circuit is configured to execute a vector load memory operation to load a vector having a plurality of vector elements, wherein the execution circuit is configured to permit forwarding of a vector element from the store queue as long as each vector element obtains a complete set of data from a single source.

12. The load/store unit as recited in claim 9 wherein the execution circuit is configured to execute a vector load memory operation to load a vector having a plurality of vector elements, wherein the plurality of vector elements comprises a plurality of atomic elements, and wherein each of the atomic elements comprises a plurality of adjacent vector elements within the plurality of vector elements, wherein the execution circuit is configured to permit forwarding of a given atomic element of the plurality of atomic elements from the store queue as long as each atomic element of the plurality of atomic elements obtains a complete set of data from a single source.

13. The load/store unit as recited in claim 9 wherein, if at least one of the plurality of registers does not receive the complete set of data from the single source, the execution circuit is configured to stall the load memory operation until the store queue empties.

14. A method comprising:
executing a load memory operation having an operation size that is larger than an atomicity size implemented for compliance with a memory ordering model;
verifying, for compliance with the memory ordering model, that each of a plurality of atomic elements within data of the operation size are fully sourced from either a store memory operation in a store queue or from a different source, wherein the plurality of atomic elements are of the atomicity size; and
permitting forwarding from the store queue responsive to the verifying.

15. The method as recited in claim 14 further comprising:
executing a second load memory operation having the operation size;
detecting that at least one of the plurality of atomic elements within data of the operation size are not fully sourced from either the store memory operation in a store queue or from a different source, but at least one of the plurality of atomic elements is sourced from the store queue; and
preventing completion of the second load memory operation from completing.

16. The method as recited in claim 15 wherein the preventing is continued until the store queue empties.

17. The method as recited in claim 14 wherein the plurality of atomic elements correspond to a plurality of registers targeted by the load memory operation.

* * * * *